(12) United States Patent
Maase et al.

(10) Patent No.: US 7,754,002 B2
(45) Date of Patent: Jul. 13, 2010

(54) SOLUBILITY OF CELLULOSE IN IONIC LIQUIDS WITH ADDITION OF AMINO BASES

(75) Inventors: Matthias Maase, Speyer (DE); Veit Stegmann, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 262 days.

(21) Appl. No.: 11/911,586

(22) PCT Filed: Apr. 12, 2006

(86) PCT No.: PCT/EP2006/061560

§ 371 (c)(1),
(2), (4) Date: Oct. 15, 2007

(87) PCT Pub. No.: WO2006/108861

PCT Pub. Date: Oct. 19, 2006

(65) Prior Publication Data

US 2008/0164440 A1    Jul. 10, 2008

(30) Foreign Application Priority Data

Apr. 15, 2005    (DE) ....................... 10 2005 017 733

(51) Int. Cl.
*C09D 101/02* (2006.01)
*C08L 1/02* (2006.01)
*C08K 5/3445* (2006.01)
(52) U.S. Cl. ................................. 106/200.2
(58) Field of Classification Search ................ 106/200.2
See application file for complete search history.

(56) References Cited

U.S. PATENT DOCUMENTS

| | | | |
|---|---|---|---|
| 1,924,238 A | | 8/1933 | Graenacher |
| 1,943,176 A | | 9/1934 | Graenacher |
| 6,808,527 B2 | * | 10/2004 | Lower et al. ............ 606/62 |
| 6,824,599 B2 | * | 11/2004 | Swatloski et al. ...... 106/163.01 |
| 2004/0073035 A1 | | 4/2004 | Maase et al. |
| 2005/0020857 A1 | | 1/2005 | Volland et al. |
| 2007/0006774 A1 | * | 1/2007 | Rogers et al. ............ 106/200.2 |

FOREIGN PATENT DOCUMENTS

| DE | 102 02 838 A1 | 8/2003 |
|---|---|---|
| WO | WO 03/029329 A2 | 4/2003 |

OTHER PUBLICATIONS

Peter Wasserscheidt, "Edukt/Produktphase", Angew. Chem., vol. 112, 2000, pp. 3926-3945.
K. N. Marsh, et al., "Room Temperature Ionic Liquids and Their Mixtures-A Review", Fluid Phase Equilibria, vol. 219, 2004, pp. 93-98.
Johnathan G. Huddleston, et al., "Characterization and Comparison of Hydrophilic and Hydrophobic Room Temperature Ionic Liquids Incorporating the Imidazolium Cation", Green Chemistry, vol. 3, 2001, pp. 156-164.
Von E. Husemann, et al., "N-Athyl-Pyridinium-Chlorid Als Lösungsmittel Und Reaktionsmedium Für Cellulose", Makromolekulare Chemie, XP 009073037, vol. 128, No. 3178, 1969, pp. 288-291.

* cited by examiner

*Primary Examiner*—David M Brunsman
(74) *Attorney, Agent, or Firm*—Oblon, Spivak, McClelland, Maier & Neustadt, L.L.P.

(57) ABSTRACT

The present invention relates to a solution comprising cellulose, an ionic liquid comprising anions and cations as solvent and 6-30% by weight of a nitrogen-comprising base, based on the total weight of the solution, its preparation and also its use for the physical or chemical treatment of cellulose.

7 Claims, No Drawings

SOLUBILITY OF CELLULOSE IN IONIC LIQUIDS WITH ADDITION OF AMINO BASES

This application is a 371 of PCT/EP2006/061560, filed Apr. 12, 2006.

The present invention relates to a solution comprising cellulose and an ionic liquid as solvent, a process for preparing it and its use.

Cellulose is a very versatile raw material. In the textile industry, cellulose is, for example, the most important constituent of fiber raw materials, in particular of cotton.

Cellulose can be used unchanged or after physical or chemical treatment. In the latter two cases, it is advantageous for cellulose to be in preferably completely dissolved form in a solvent. However, cellulose is insoluble in most solvents.

Cellulose is soluble as a copper chelate complex in some copper solutions. Regenerated cellulose can be obtained by precipitation of the cellulose. However, such copper solutions are not very suitable as solvents for cellulose in the case of physical or chemical treatment of the cellulose.

For this reason, the systems known, inter alia, as ionic liquids in the literature were proposed very early on as solvents for cellulose.

Thus, U.S. Pat. No. 1,943,176 describes the dissolution of cellulose in benzylpyridinium chloride.

As an example of an ionic liquid, benzylpyridinium chloride is a salt which is present in molten form and thus as a liquid at comparatively low temperatures.

Ionic liquids are becoming increasingly important as solvents, e.g. for carrying out chemical reactions. Peter Wasserscheidt, Angew. Chem. 2000, 112, 3926-3945, for example, gives an overview of the use of ionic liquids in transition metal catalysis.

Ionic liquids which are present in the liquid state even at room temperature are described, for example, by K. N. Marsh et al., Fluid Phase Equilibria 219 (2004), 93-98, and J. G. Huddleston et al., Green Chemistry 2001, 3, 156-164.

DE-A 102 02 838 describes the use of ionic liquids for separating acids from chemical mixtures.

Owing to the good solvent capabilities of ionic liquids, their use for the dissolution of cellulose is also proposed in the more recent international patent application WO-A 03/029329. However, it is emphasized there that such a solution comprises cellulose and an ionic liquid as solvent must comprise essentially no nitrogen-comprising bases.

Although the characteristics of the cellulose-comprising solution and its preparation described in WO-A 03/029329 have good results, there is a need to provide improved solutions.

It is therefore an object of the present invention to provide a solution of dissolved cellulose which displays improved properties.

The object is achieved by a solution comprising cellulose, an ionic liquid comprising anions and cations as solvent and from 6 to 30% by weight of a nitrogen-comprising base, based on the total weight of the solution.

It has been found that when a nitrogen-comprising base is added in the concentration range indicated, an improvement in the properties of the solution, for example in respect of the dissolution rate of the cellulose, a lower viscosity and a reduction in the melting point of the ionic liquid can be achieved at least partly.

The cellulose to be dissolved can originate from, for example, regenerated cellulose, fibrous cellulose, wood fibers, lint, cotton or paper.

It is preferred that, in the solution of the present invention, more than 1% by weight of cellulose, based on the total weight of the solution, are completely dissolved. More preferably, more than 3% by weight, particularly preferably more than 5% by weight and in particular at least 7% by weight, based on the total weight of the solution, are completely dissolved.

Advantageously, up to 35% by weight of cellulose, based on the total weight of the solution, can be completely dissolved. Furthermore, up to 25% by weight of cellulose, based on the total weight of the solution, can be completely dissolved. Solutions in which up to 15% by weight of cellulose are completely dissolved are especially suitable for particular applications.

For the purposes of the present invention, ionic liquids are preferably salts of the general formula (A) salts of the general formula (I)

$$[A]_n^+[Y]^{n-} \quad (I),$$

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

(B) mixed salts of the general formulae (II)

where n=2;

where n=3; or

where n=4, and where $[A^1]^+$, $[A^2]^+$, $[A^3]^+$ and $[A^4]^+$ are selected independently from among the groups mentioned for $[A]^+$, and $[Y]^{n-}$ is as defined under (A); or (C) mixed salts of the general formulae (III)

where n=4;

where n=4;

where n=4;

where n=3;

where n=3;

where n=2;

where n=4;

where n=4;

$$[A^1]^+[M^5]^{3+}[Y]^{n-} \quad (IIIi),$$

where n=4; or $$[A^1]^+[M^4]^{2+}[Y]^{n-} \quad (IIIj),$$

where n=3, and where $[A^1]^+$, $[A^2]^+$ and $[A^3]^+$ are selected independently from among the groups mentioned for $[A]^+$, $[Y]^{n-}$ is as defined under (A) and $[M^1]^+$, $[M^2]^+$, $[M^3]^+$ are monovalent metal cations, $[M^4]^{2+}$ is a divalent metal cation and $[M^5]^{3+}$ is a trivalent metal cation.

The ionic liquids preferably have a melting point of less than 180° C. The melting point is more preferably in the range from −50° C. to 150° C., still more preferably in the range from −20° C. to 120° C. and most preferably below 100° C.

Compounds which are suitable for forming the cations $[A]^+$ of ionic liquids are, for example, known from DE 102 02 838 A1. Thus, such compounds can comprise oxygen, phosphorus, sulfur or in particular nitrogen atoms, for example at least one nitrogen atom, preferably 1-10 nitrogen atoms, particularly preferably 1-5 nitrogen atoms, very particularly preferably 1-3 nitrogen atoms and in particular 1-2 nitrogen atoms. If appropriate, further heteroatoms such as oxygen, sulfur or phosphorus atoms can also be comprised. The nitrogen atom is a suitable carrier of the positive charge in the cation of the ionic liquid, from which a proton or an alkyl radical can then be transferred in equilibrium to the anion so as to produce an electrically neutral molecule.

If the nitrogen atom is the carrier of the positive charge in the cation of the ionic liquid, a cation can firstly be produced by quaternization of the nitrogen atom of, for example, an amine or nitrogen heterocycle in the synthesis of the ionic liquids. The quaternization can be effected by alkylation of the nitrogen atom. Depending on the alkylation reagent used, salts having different anions are obtained. In cases in which it is not possible to form the desired anion directly in the quaternization, this can be effected in a further step of the synthesis. For example, starting from an ammonium halide, the halide can be reacted with a Lewis acid to form a complex anion from the halide and Lewis acid. As an alternative, it is possible to replace a halide ion by the desired anion. This can be achieved by addition of a metal salt with precipitation of the metal halide formed, by means of an ion exchanger or by displacement of the halide ion by a strong acid (with liberation of the hydrogen halide). Suitable methods are described, for example, in Angew. Chem. 2000, 112, pp. 3926-3945, and the references cited therein.

Suitable alkyl radicals by which the nitrogen atom in the amines or nitrogen heterocycles can, for example, be quaternized are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or bear one or more identical or different substituents.

Preference is given to compounds which comprise at least one five- or six-membered heterocycle, in particular a five-membered heterocycle, which has at least one nitrogen atom and, if appropriate, an oxygen or sulfur atom; particular preference is given to compounds which comprise at least one five- or six-membered heterocycle which has one, two or three nitrogen atoms and a sulfur or oxygen atom, very particularly preferably those having two nitrogen atoms. Preference is also given to aromatic heterocycles.

Particularly preferred compounds are ones which have a molecular weight of less than 1000 g/mol, very particularly preferably less than 500 g/mol and in particular less than 250 g/mol.

Furthermore, preference is given to cations which are selected from among the compounds of the formulae (IVa) to (IVw),

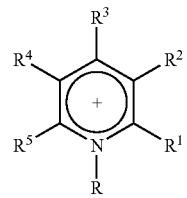
(IVa)

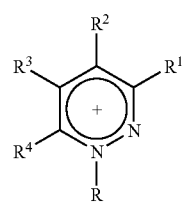
(IVb)

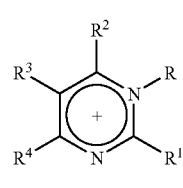
(IVc)

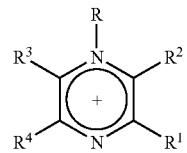
(IVd)

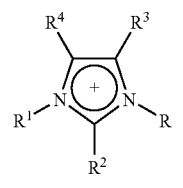
(IVe)

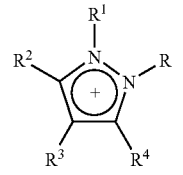
(IVf)

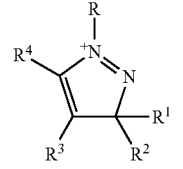
(IVg)

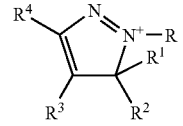
(IVg')

-continued
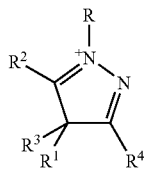
(IVh)
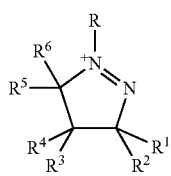
(IVi)
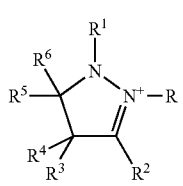
(IVj)
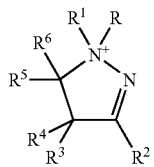
(IVj')
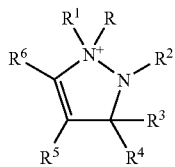
(IVk)
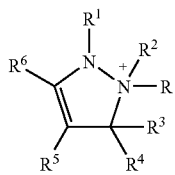
(IVk')
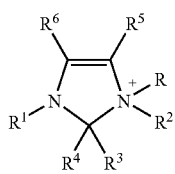
(IVl)
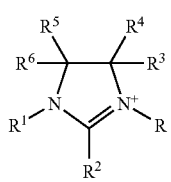
(IVm)
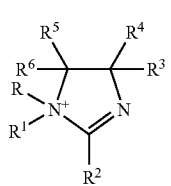
(IVm')
-continued
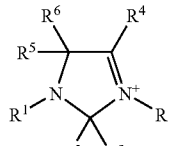
(IVn)
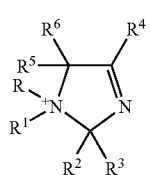
(IVn')
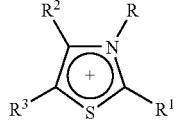
(IVo)
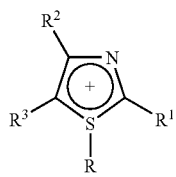
(IVo')
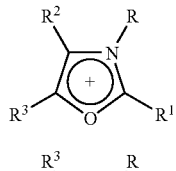
(IVp)
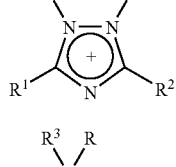
(IVq)
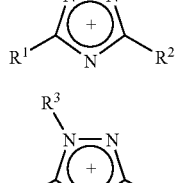
(IVq')
(IVq'')
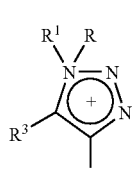
(IVr)
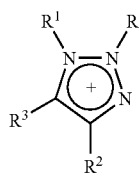
(IVr')

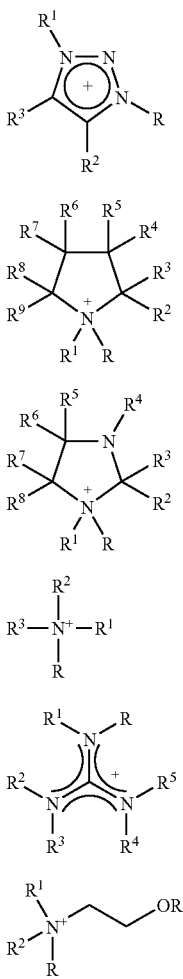

and oligomers comprising these structures.

Further suitable cations are compounds of the general formulae (IVx) and (IVy)

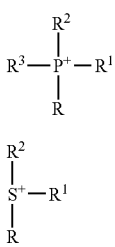

and oligomers comprising this structure.

In the abovementioned formulae (IVa) to (IVy), the radical R is hydrogen, a carbon-comprising organic, saturated or unsaturated, acyclic or cyclic, aliphatic, aromatic or araliphatic radical which has from 1 to 20 carbon atoms and is unsubstituted or interrupted by from 1 to 5 heteroatoms or functional groups or substituted; and the radicals $R^1$ to $R^9$ are each, independently of one another, hydrogen, a sulfo group or a carbon-comprising organic, saturated or unsaturated, acyclic or cyclic, aliphatic, aromatic or araliphatic radical which has from 1 to 20 carbon atoms and is unsubstituted or interrupted by from 1 to 5 heteroatoms or functional groups or substituted, with the radicals $R^1$ to $R^9$ which are bound to a carbon atom (and not to a heteroatom) in the abovementioned formulae (IV) also being able to be halogen or a functional group; or two adjacent radicals from the group consisting of $R^1$ to $R^9$ can together also be a divalent, carbon-comprising organic, saturated or unsaturated, acyclic or cyclic, aliphatic, aromatic or araliphatic radical which has from 1 to 30 carbon atoms and is unsubstituted or interrupted by from 1 to 5 heteroatoms or functional groups or substituted.

Preferred are cations of formulae (IVb) to (IVy).

In the definition of the radicals R and $R^1$ to $R^9$, heteroatoms are in principle all heteroatoms which are formally able to replace a —$CH_2$—, —CH=, —C≡, or =C= group. If the carbon-comprising radical comprises heteroatoms, then preference is given to oxygen, nitrogen, sulfur, phosphorus and silicon. Preferred groups are, in particular, —O—, —S—, —SO—, —$SO_2$—, —NR'—, —N=, —PR'—, —$PR'_2$ and —$SiR'_2$—, where the radicals R' are the remaining part of the carbon-comprising radical. The radicals $R^1$ to $R^9$ can in the cases in which they are bound to a carbon atom (and not to a heteroatom) in the abovementioned formula (IV) also be bound directly via the heteroatom.

Possible functional groups are in principle all functional groups which can be bound to a carbon atom or a heteroatom. Examples of suitable functional groups are —OH (hydroxy), =O (in particular as a carbonyl group), —$NH_2$ (amino), =NH (imino), —COOH (carboxy), —$CONH_2$ (carboxamide), —$SO_3H$ (sulfo) and —CN (cyano). Functional groups and heteroatoms can also be directly adjacent so that combinations of a plurality of adjacent atoms, for instance —O— (ether), —S— (thioether), —COO— (ester), —CONH— (secondary amide) or —CONR'— (tertiary amide), are also comprised, for example di-($C_1$-$C_4$-alkyl)amino, $C_1$-$C_4$-alkyloxycarbonyl or $C_1$-$C_4$-alkyloxy.

Halogens may be fluorine, chlorine, bromine and iodine.

The radical R is preferably $C_1$-$C_{18}$-alkyl which may be unbranched or branched and unsubstituted or substituted by one or more hydroxy, halogen, phenyl, cyano, $C_1$-$C_6$-alkoxycarbonyl and/or sulfonic acid substituents and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl) ethyl, 2-(ethoxycarbonyl)ethyl, 2-(n-butoxycarbonyl) ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;

glycols, butylene glycols and oligomers thereof having from 1 to 100 units and a hydrogen atom or a $C_1$-$C_8$-alkyl group as end group, for example $R^A O$—$(CHR^B$—$CH_2$—$O)_n$—$CHR^B CH_2$— or $R^A O$—$(CH_2 CH_2 CH_2 CH_2 O)_n$—$CH_2 CH_2$. $CH_2 CH_2 O$— where $R^A$ and $R^B$ are preferably hydrogen, methyl or ethyl and n is preferably from 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl; and

N,N-di-$C_1$-$C_6$-alkylamino, for example N,N-dimethylamino and N,N-diethylamino.

In case the cation is a pyridinium ion of formula (Iva) it is preferred, that R is other than benzyl, allyl, ethyl or ethoxycarbonylmethyl, wherein $R^1$ to $R^5$ is H.

The radical R is particularly preferably unbranched and unsubstituted $C_1$-$C_{18}$-alkyl, for example methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, in particular methyl, ethyl, 1-butyl and 1-octyl, or $CH_3O$—$(CH_2 CH_2 O)_n$—$CH_2 CH_2$— and $CH_3 CH_2 O$—$(CH_2 CH_2 O)_n$—$CH_2 CH_2$— where n is from 0 to 3.

The radicals $R^1$ to $R^9$ are preferably, independently of one another, hydrogen;

halogen;

a functional group;

$C_1$-$C_{18}$-alkyl which is optionally substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_2$-$C_{18}$-alkenyl which is optionally substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_6$-$C_{12}$-aryl which is optionally substituted by functional groups, aryl, alkyl, aryloxy, alkyloxy, halogen, heteroatoms and/or heterocycles;

$C_5$-$C_{12}$-cycloalkyl which is optionally substituted by functional groups, aryl, alkyl, aryloxy, alkyloxy, halogen, heteroatoms and/or heterocycles;

$C_5$-$C_{12}$-cycloalkenyl which is optionally substituted by functional groups, aryl, alkyl, aryloxy, alkyloxy, halogen, heteroatoms and/or heterocycles; or a five- or six-membered, oxygen-, nitrogen- and/or sulfur-comprising heterocycle which is optionally substituted by functional groups, aryl, alkyl, aryloxy, alkyloxy, halogen, heteroatoms and/or heterocycles; or two adjacent radicals together form an unsaturated, saturated or aromatic ring which is optionally substituted by functional groups, aryl, alkyl, aryloxy, alkyloxy, halogen, heteroatoms and/or heterocycles and optionally interrupted by one or more oxygen and/or sulfur atoms and/or one or more substituted or unsubstituted imino groups.

$C_1$-$C_{18}$-alkyl which is optionally substituted by functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl (phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_n F_{2(n-a)+(1-b)} H_{2a+b}$ where n is from 1 to 30, $0 \leq a \leq n$ and b=0 or 1 (for example $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)ethyl, 2-(ethoxycarbonyl)ethyl, 2-(n-butoxycarbonyl)ethyl, butylthiomethyl, 2-dodecylthioethyl, 2-phenylthioethyl, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-dioxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_{18}$-Alkenyl which is optionally substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_n F_{2(n-a)-(1-b)} H_{2a-b}$ where $n \leq 30$, $0 \leq a \leq n$ and b=0 or 1.

$C_6$-$C_{12}$-Aryl which is optionally substituted by functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorphenyl, 4-bromophenyl, 2-nitrophenyl, 4-nitrophenyl, 2,4-dinitrophenyl, 2,6-dinitrophenyl, 4-dimethylaminophenyl, 4-acetylphenyl, ethoxyethylphenyl, ethoxymethylphenyl, methylthiophenyl, isopropylthiophenyl or tert-butylthiophenyl or $C_6F_{(5-a)}H_a$ where $0 \leq a \leq 5$.

$C_5$-$C_{12}$-Cycloalkyl which is optionally substituted by functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_nF_{2(n-a)-(1-b)}H_{2a-b}$ where $n \leq 30$, $0 \leq a \leq n$ and $b=0$ or 1 or a saturated or unsaturated bicyclic system such as norbornyl or norbornenyl.

$C_5$-$C_{12}$-Cycloalkenyl which is optionally substituted by functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_nF_{2(n-a)-3(1-b)}H_{2a-3b}$ where $n \leq 30$, $0 \leq a \leq n$ and $b=0$ or 1.

A five- or six-membered, oxygen-, nitrogen- and/or sulfur-comprising heterocycle which is optionally substituted by functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring which is optionally substituted by functional groups, aryl, alkyl, aryloxy, alkyloxy, halogen, heteroatoms and/or heterocycles and optionally interrupted by one or more oxygen and/or sulfur atoms and/or one or more substituted or unsubstituted imino groups, the two radicals together are preferably 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. In general, there will be no more than 5 in the radical, preferably no more than 4 and very particularly preferably no more than 3.

If the abovementioned radicals comprise heteroatoms, there is generally at least one carbon atom, preferably at least two carbon atoms, between any two heteroatoms.

The radicals $R^1$ to $R^9$ are particularly preferably, independently of one another, hydrogen;

unbranched or branched $C_1$-$C_{18}$-alkyl which is unsubstituted or substituted by one or more hydroxy, halogen, phenyl, cyano, $C_1$-$C_6$-alkoxycarbonyl and/or sulfonic acid substituents and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexa-decyl, 1-octadecyl, 2-hydroxyethyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;

glycols, butylene glycols and oligomers thereof having from 1 to 100 units and a hydrogen atom or a $C_1$-$C_8$-alkyl group as end group, for example $R^AO$—$(CHR^B$—$CH_2$—$O)_n$—$CHR^B$—$CH_2$— or $R^AO$—$(CH_2CH_2CH_2CH_2O)_n$—$CH_2CH_2CH_2CH_2O$— where $R^A$ and $R^B$ are preferably hydrogen, methyl or ethyl and n is preferably from 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl; and

N,N-di-$C_1$-$C_6$-alkylamino, for example N,N-dimethylamino and N,N-diethylamino.

The radicals $R^1$ to $R^9$ are very particularly preferably, independently of one another, hydrogen or $C_1$-$C_{18}$-alkyl, for example methyl, ethyl, 1-butyl, 1-pentyl, 1-hexyl, 1-heptyl, 1-octyl, phenyl, 2-hydroxyethyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine or $CH_3O$—$(CH_2CH_2O)_n$—$CH_2CH_2$— and $CH_3CH_2O$—$(CH_2CH_2O)_n$—$CH_2CH_2$— where n is from 0 to 3.

Very particularly preferred pyridinium ions (IVa) are those in which one of the radicals $R^1$ to $R^5$ is methyl, ethyl or chlorine and the remaining radicals $R^1$ to $R^5$ are hydrogen;

$R^3$ is dimethylamino and the remaining radicals $R^1$, $R^2$, $R^4$ and $R^5$ are hydrogen;

all radicals $R^1$ to $R^5$ are hydrogen;

$R^2$ is carboxy or carboxamide and the remaining radicals $R^1$, $R^2$, $R^4$ and $R^5$ are hydrogen; or $R^1$ and $R^2$ or $R^2$ and $R^3$ are together 1,4-buta-1,3-dienylene and the remaining radicals $R^1$, $R^2$, $R^4$ and $R^5$ are hydrogen;

and, in particular, those in which $R^1$ to $R^5$ are hydrogen; or one of the radicals $R^1$ to $R^5$ is methyl or ethyl and the remaining radicals $R^1$ to $R^5$ are hydrogen.

Very particularly preferred pyridinium ions (IVa) are 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetra-decyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-di-ethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Very particularly preferred pyridazinium ions (IVb) are those in which $R^1$ to $R^4$ are hydrogen; or one of the radicals $R^1$ to $R^4$ is methyl or ethyl and the remaining radicals $R^1$ to $R^4$ are hydrogen.

Very particularly preferred pyrimidinium ions (IVc) are those in which $R^1$ is hydrogen, methyl or ethyl and $R^2$ to $R^4$ are each, independently of one another, hydrogen or methyl; or $R^1$ is hydrogen, methyl or ethyl, $R^2$ and $R^4$ are methyl and $R^3$ is hydrogen.

Very particularly preferred pyrazinium ions (IVd) are those in which $R^1$ is hydrogen, methyl or ethyl and $R^2$ to $R^4$ are each, independently of one another, hydrogen or methyl;

$R^1$ is hydrogen, methyl or ethyl, $R^2$ and $R^4$ are methyl and $R^3$ is hydrogen;

$R^1$ to $R^4$ are methyl; or $R^1$ to $R^4$ are methyl or hydrogen.

Very particularly preferred imidazolium ions (IVe) are those in which $R^1$ is hydrogen, methyl, ethyl, 1-propyl, 1-butyl, 1-pentyl, 1-hexyl, 1-octyl, 2-hydroxyethyl or 2-cyanoethyl and $R^2$ to $R^4$ are each, independently of one another, hydrogen, methyl or ethyl.

Very particularly preferred imidazolium ions (IVe) are 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Very particularly preferred pyrazolium ions (IVf), (IVg) or (IVg') are those in which $R^1$ is hydrogen, methyl or ethyl and $R^2$ to $R^4$ are each, independently of one another, hydrogen or methyl.

Very particularly preferred pyrazolium ions (IVh) are those in which $R^1$ to $R^4$ are each, independently of one another, hydrogen or methyl.

Very particularly preferred 1-pyrazolinium ions (IVi) are those in which $R^1$ to $R^6$ are each, independently of one another, hydrogen or methyl.

Very particularly preferred 2-pyrazolinium ions (IVj) or (IVj') are those in which $R^1$ is hydrogen, methyl, ethyl or phenyl and $R^2$ to $R^6$ are each, independently of one another, hydrogen or methyl.

Very particularly preferred 3-pyrazolinium ions (IVk) or (IVk') are those in which $R^1$ and $R^2$ are each, independently of one another, hydrogen, methyl, ethyl or phenyl and $R^3$ to $R^6$ are each, independently of one another, hydrogen or methyl.

Very particularly preferred imidazolinium ions (IVl) are those in which $R^1$ and $R^2$ are each, independently of one another, hydrogen, methyl, ethyl, 1-butyl or phenyl, $R^3$ and $R^4$ are each, independently of one another, hydrogen, methyl or ethyl and $R^5$ and $R^6$ are each, independently of one another, hydrogen or methyl.

Very particularly preferred imidazolinium ions (IVm) or (IVm') are those in which $R^1$ and $R^2$ are each, independently of one another, hydrogen, methyl or ethyl and $R^3$ to $R^6$ are each, independently of one another, hydrogen or methyl.

Very particularly preferred imidazolinium ions (IVn) or (IVn') are those in which $R^1$ to $R^3$ are each, independently of one another, hydrogen, methyl or ethyl and $R^4$ to $R^6$ are each, independently of one another, hydrogen or methyl.

Very particularly preferred thiazolium ions (IVo) or (IVo') and oxazolium ions (IVp) are those in which $R^1$ is hydrogen, methyl, ethyl or phenyl and $R^2$ and $R^3$ are each, independently of one another, hydrogen or methyl.

Very particularly preferred 1,2,4-triazolium ions (IVq), (IVq') or (IVq") are those in which $R^1$ and $R^2$ are each, independently of one another, hydrogen, methyl, ethyl or phenyl and $R^3$ is hydrogen, methyl or phenyl.

Very particularly preferred 1,2,3-triazolium ions (IVr), (IVr') or (IVr") are those in which $R^1$ is hydrogen, methyl or ethyl and $R^2$ and $R^3$ are each, independently of one another, hydrogen or methyl, or $R^2$ and $R^3$ are together 1,4-buta-1,3-dienylene.

Very particularly preferred pyrrolidinium ions (IVs) are those in which $R^1$ is hydrogen, methyl, ethyl or phenyl and $R^2$ to $R^9$ are each, independently of one another, hydrogen or methyl.

Very particularly preferred imidazolidinium ions (IVt) are those in which $R^1$ and $R^4$ are each, independently of one another, hydrogen, methyl, ethyl or phenyl and $R^2$ and $R^3$ and also $R^5$ to $R^8$ are each, independently of one another, hydrogen or methyl.

Very particularly preferred ammonium ions (IVu) are those in which $R^1$ to $R^3$ are each, independently of one another, $C_1$-$C_{18}$-alkyl; or $R^1$ and $R^2$ are together 1,5-pentylene or 3-oxa-1,5-pentylene and $R^3$ is $C_1$-$C_{18}$-alkyl, 2-hydroxyethyl or 2-cyanoethyl.

Very particularly preferred ammonium ions (IVu) are methyltri(1-butyl)ammonium, N,N-dimethylpiperidinium and N,N-dimethylmorpholinium.

Examples of tertiary amines from which the quaternary ammonium ions of the general formula (IVu) are derived from quaternation by the abovementioned radicals R are diethyl-n-butylamine, diethyl-tert-butylamine, diethyl-n-pentylamine, diethylhexylamine, diethyloctylamine, diethyl(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutylamine, diisopropylpentylamine, diisopropylhexylamine, diisopropyloctylamine, diisopropyl(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidene, N,N-diethyl-p-toluidene, N,N-di-n-butyl-p-toluidene, diethylbenzylamine, di-n-propylbenzylamine, di-n-butylbenzylamine, diethylphenylamine, di-n-propylphenylamine and di-n-butylphenylamine.

Preferred tertiary amines (IVu) are diisopropylethylamine, diethyl-tert-butylamine, diisopropylbutylamine, di-n-butyl-n-pentylamine, N,N-di-n-butylcyclohexylamine and tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Very particularly preferred guanidinium ions (IVv) are those in which $R^1$ to $R^5$ are methyl.

A very particularly preferred guanidinium ion (IVv) is N,N,N',N',N'',N''-hexamethylguanidinium.

Very particularly preferred cholinium ions (IVw) are those in which $R^1$ and $R^2$ are each, independently of one another, methyl, ethyl, 1-butyl or 1-octyl and $R^3$ is hydrogen, methyl, ethyl, acetyl, —SO$_2$OH or —PO(OH)$_2$;

$R^1$ is methyl, ethyl, 1-butyl or 1-octyl, $R^2$ is a —CH$_2$—CH$_2$—OR$^4$ group and $R^3$ and $R^4$ are each, independently of one another, hydrogen, methyl, ethyl, acetyl, —SO$_2$OH or —PO(OH)$_2$; or $R^1$ is a —CH$_2$—CH$_2$—OR$^4$ group, $R^2$ is a —CH$_2$—CH$_2$—OR$^5$ group and $R^3$ to $R^5$ are each, independently of one another, hydrogen, methyl, ethyl, acetyl, —SO$_2$OH or —PO(OH)$_2$.

Particularly preferred cholinium ions (IVw) are those in which $R^3$ is selected from among hydrogen, methyl, ethyl, acetyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

Very particularly preferred phosphonium ions (IVx) are those in which $R^1$ to $R^3$ are each, independently of one another, $C_1$-$C_{18}$-alkyl, in particular butyl, isobutyl, 1-hexyl or 1-octyl.

Among the abovementioned heterocyclic cations, the pyridinium ions, pyrazolinium ions, pyrazolium ions and imidazolinium ions and also the imidazolium ions are preferred. Preference is also given to ammonium ions.

Very particular preference is given to 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethyl-pyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2-methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

The metal cations $[M^1]^+$, $[M^2]^+$, $[M^3]^+$, $[M^4]^{2+}$ and $[M^5]^{3+}$ mentioned in the formulae (IIIa) to (IIIj) are generally metal cations of groups 1, 2, 6, 7, 8, 9, 10, 11, 12 and 13 of the Periodic Table. Suitable metal cations are, for example, Li$^+$, Na$^+$, K$^+$, Cs$^+$, Mg$^{2+}$, Ca$^{2+}$, Ba$^{2+}$, Cr$^{3+}$, Fe$^{2+}$, Fe$^{3+}$, Co$^{2+}$, Ni$^{2+}$, Cu$^{2+}$, Ag$^+$, Zn$^{2+}$ and Al$^{3+}$.

As anions, it is in principle possible to use all anions.

The anion $[Y]^{n-}$ of the ionic liquid is, for example, selected from among the group of halides and halogen compounds of the formulae:

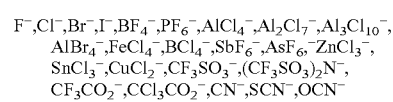

the group of sulfates, sulfites and sulfonates of the general formulae:

$$SO_4^{2-}, HSO_4^-, SO_3^{2-}, HSO_3^-, R^aOSO_3^-, R^aSO_3^-$$

the group of phosphates of the general formulae $$PO_4^{3-}, HPO_4^{2-}, H_2PO_4^-, R^aPO_4^{2-}, HR^aPO_4^-, R^aR^bPO_4^-$$

the group of phosphonates and phosphinates of the general formulae:

$$R^aHPO_3^-, R^aR^bPO_2^-, R^aR^bPO_3^-$$

the group of phosphites of the general formulae:

$$PO_3^{3-}, HPO_3^{2-}, H_2PO_3^-, R^aPO_3^{2-}, R^aHPO_3^-, R^aR^bPO_3^-$$

the group of phosphonites and phosphinites of the general formulae:

$$R^aR^bPO_2^-, R^aHPO_2^-, R^aR^bPO^-, R^aHPO^-$$

the group of carboxylic acids of the general formula:

$$R^aCOO^-$$

the group of borates of the general formulae:

$$BO_3^{3-}, HBO_3^{2-}, H_2BO_3^-, R^aR^bBO_3^-, R^aHBO_3^-,$$
$$R^aBO_3^{2-}, B(OR^a)(OR^b)(OR^c)(OR^d)^-, B(HSO_4)^-,$$
$$B(R^aSO_4)^-$$

the group of boronates of the general formulae:

$$R^aBO_2^{2-}, R^aR^bBO^-$$

the group of carbonates and carbonic esters of the general formulae:

$$HCO_3^-, CO_3^{2-}, R^aCO_3^-$$

the group of silicates and silicic esters of the general formulae:

$$SiO_4^{4-}, HSiO_4^{3-}, H_2SiO_4^{2-}, H_3SiO_4^-, R^aSiO_4^{3-}, R^aR^b-$$
$$SiO_4^{2-}, R^aR^bR^cSiO_4^-, HR^aSiO_4^{2-}, H_2R^aSiO_4^-,$$
$$HR^aR^bSiO_4^-$$

the group of alkyl silane and aryl silane salts of the general formulae:

$$R^aSiO_3^{3-}, R^aR^bSiO_2^{2-}, R^aR^bR^cSiO^-, R^aR^bR^cSiO_3^-,$$
$$R^aR^bR^cSiO_2^-, R^aR^bSO_3^{2-}$$

the group of carboximides, bis(sulfonyl)imides and sulfonylimides of the general formulae:

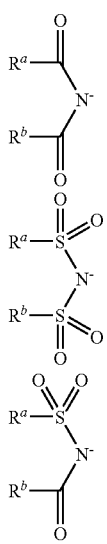

the group of methides of the general formula:

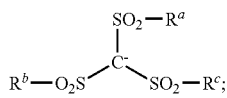

the group of alkoxides and aryloxides of the general formula:

$$R^aO^-;$$

the group of halometalates of the general formula:

$$[M_qHal_r]^{s-},$$

where M is a metal and Hal is fluorine, chlorine, bromine or iodine, q and r are positive integers and indicate the stoichiometry of the complex and s is a positive integer and indicates the charge on the complex;

the group of sulfides, hydrogen sulfides, polysulfides, hydrogen polysulfides and thiolates of the general formulae:

$$S^{2-}, HS^-, [S_v]^{2-}, [HS_v]^-, [R^aS]^-,$$

where v is a positive integer from 2 to 10;

the group of complex metal ions such as $Fe(CN)_6^{3-}$, $Fe(CN)_6^{4-}$, $MnO_4^-$, $Fe(CO)_4^-$.

Here, $R^a$, $R^b$, $R^c$ and $R^d$ are each, independently of one another, hydrogen, $C_1$-$C_{30}$-alkyl, $C_2$-$C_{18}$-alkyl which is optionally interrupted by one or more nonadjacent oxygen and/or sulfur atoms and/or one or more substituted or unsubstituted imino groups, $C_6$-$C_{14}$-aryl, $C_5$-$C_{12}$-cycloalkyl or a five- or six-membered, oxygen-, nitrogen- and/or sulfur-comprising heterocycle, where two of them may together form an unsaturated, saturated or aromatic ring which is optionally interrupted by one or more oxygen and/or sulfur atoms and/or one or more unsubstituted or substituted imino groups, where the radicals mentioned may each be additionally substituted by functional groups, aryl, alkyl, aryloxy, alkyloxy, halogen, heteroatoms and/or heterocycles.

Here, $C_1$-$C_{18}$-alkyl which is optionally substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylthyl, 2-ethoxycarbonylethyl, 2-butoxycarbonylpropyl, 1,2-di-(methoxycarbonyl) ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-Alkyl which is optionally substituted by one or more nonadjacent oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, these radicals can together form, for example, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene as fused-on building block.

The number of nonadjacent oxygen and/or sulfur atoms and/or imino groups is in principle not subject to any restrictions or is automatically restricted by the size of the radical or the cyclic building block. In general, it will be no more than 5 in the respective radical, preferably no more than 4 and very particularly preferably no more than 3. Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

For the purposes of the present invention, the term "functional groups" refers, for example, to the following: carboxy, carboxamide, hydroxy, di-($C_1$-$C_4$-alkyl)amino, $C_1$-$C_4$-alkyloxycarbonyl, cyano or $C_1$-$C_4$-alkoxy. Here, $C_1$-$C_4$-alkyl is methyl, ethyl, propyl, isopropyl, n-butyl, sec-butyl or tert-butyl.

$C_6$-$C_{14}$-Aryl which is optionally substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl which is optionally substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl.

A five- or six-membered, oxygen-, nitrogen- and/or sulfur-comprising heterocycle is, for example, furyl, thiophenyl, pyryl, pyridyl, indolyl, benzoxazolyl, dioxolyl, dioxyl, benzimidazolyl, benzthiazolyl, dimethylpyridyl, methylquinolyl, dimethylpyryl, methoxyfuryl, dimethoxypyridyl, difluoropyridyl, methylthiophenyl, isopropylthiophenyl or tert-butylthiophenyl.

Preferred anions are selected from the group of halides and halogen-comprising compounds, the group of carboxylic acids, the group of sulfates, sulfites and sulfonates and the group of phosphates.

Preferred anions are chloride, bromide, iodide, $SCN^-$, $OCN^-$, $CN^-$, acetate, $C_1$-$C_4$-alkylsulfates, $R^a$—$COO^-$, $R^aSO_3^-$, $R^aR^bPO_4^-$, methanesulfonates, tosylate, $C_1$-$C_4$ dialkylphosphates, hydrogen sulfate or tetrachloroaluminate.

Particularly preferred anions are $Cl^-$, $CH_3COO^-$ or $CH_3SO_3^-$.

Both cations and anions are present in the ionic liquid. Within the ionic liquid, a proton or an alkyl radical is transferred from the cation to the anion. This forms two uncharged molecules. There is thus an equilibrium in which anions, cations and the two uncharged molecules formed therefrom are present.

The solution preferably has a temperature of not more than 180° C. The solution of the present invention more preferably has a temperature of not more than 160° C., even more preferably not more than 120° C. and particularly preferably not more than 100° C.

In a preferred embodiment, the proportion of nitrogen-comprising base is 6-20% by weight, more preferably 6-15% by weight, even more preferably 6 to 14% by weight, even more preferably 6 to 13% by weight, particularly preferably from 6 to 10% by weight, based on the total weight of the solution. Furthermore the proportion is preferably 7 to 14% by weight, especially 8 to 13% by weight.

The nitrogen-comprising base is preferably a compound whose nitrogen atom or atoms is/are primary, secondary or tertiary and which is derived from the quaternary compounds of the formulae (IVa) to (IVw), with the radical R forming the quaternary nitrogen not being present and the other substituents having, independently of one another, the abovementioned meanings and also being able, if appropriate, to be hydrogen.

The base is preferably derived from the cation present in the ionic liquid, if this is a quaternary nitrogen-comprising compound. However, it is also possible for this not to be the case.

Further preferred bases are listed in DE-A 102 02 838 on page 4, line 17, to page 7, line 51, the disclosure of which is hereby fully incorporated by reference.

Particularly preferred bases are amines, imidazoles, monoethylamine, isopropylamine, ethylhexylamine, ethanolamine or imidazole.

The present invention further provides a process for preparing a solution according to the invention, which comprises the steps addition of cellulose to a solution comprising an ionic liquid comprising anions and cations as solvent and from 6 to 30% by weight of a nitrogen-comprising base, based on the total weight of the solution, and mixing of the solution until the cellulose is completely dissolved.

Mixing is preferably carried out by means of stirring, shaking and/or with the aid of microwaves.

The dissolution preferably occurs within 3 days, more preferably within one day and particularly preferably within 12 hours.

The present invention further provides for the use of a solution according to the present invention for the physical or chemical treatment of cellulose.

The chemical treatment can comprise oxidation, reduction, pyrolysis, hydrolysis, isomeration, sterification, alkoxylation or copolymerization.

The present invention is illustrated by the following examples.

EXAMPLES

An amount of an ionic liquid and an amine is placed in a reaction vessel at 95° C. with stirring and is admixed with an amount of cellulose powder. The mixture is stirred at 95° C. until the cellulose has dissolved completely. In addition, the time required for this is determined.

The batch sizes and results are summarized in the following table.

| Ionic liquid | Amount (ion. liq.) | Amine | Amount (amine) | Amount (cellulose powder) | Time required |
|---|---|---|---|---|---|
| BMIM Cl | 10.0 g | — | — | 0.30 g | 2 h 37 min |
| BMIM Cl | 10.0 g | 1-methylimidazole | 0.99 g | 0.30 g | 48 min |
| BMIM Cl | 10.0 g | 1-methylimidazole | 2.00 g | 0.30 g | 28 min |
| BMIM acetate | 10.0 g | — | — | 0.70 g | 63 h |
| BMIM acetate | 10.0 g | 1-methylimidazole | 1.00 g | 0.70 g | 24 h |
| BMIM acetate | 10.0 g | 1-methylimidazole | 2.06 g | 0.71 g | 6 h |

BMIM = 1-n-butyl-3-methylimidazolium

The invention claimed is:

1. A solution comprising cellulose, an ionic liquid comprising anions and cations as solvent and 6-30% by weight of a nitrogen-comprising base, based on the total weight of the solution, wherein the ionic liquid comprises at least one cation of formula (IVe)

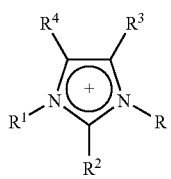

(IVe)

and oligomers comprising these structures, where the radical R is hydrogen, a carbon-comprising organic, saturated or unsaturated, acyclic or cyclic, aliphatic, aromatic or araliphatic radical which has from 1 to 20 carbon atoms and is unsubstituted or interrupted by from 1 to 5 heteroatoms or functional groups or substituted; and the radicals $R^1$ to $R^4$ are each, independently of one another, hydrogen, a sulfo group or a carbon-comprising organic, saturated or unsaturated, acyclic or cyclic, aliphatic, aromatic or araliphatic radical which has from 1 to 20 carbon atoms and is unsubstituted or interrupted by from 1 to 5 heteroatoms or functional groups or substituted, with the radicals $R^1$ to $R^4$ which are bound to a carbon atom (and not to a heteroatom) in the abovementioned formulae (IV) also being able to be halogen or a functional group; or two adjacent radicals from the group consisting of $R^1$ to $R^4$ can together also be a divalent, carbon-comprising organic, saturated or unsaturated, acyclic or cyclic, aliphatic, aromatic or araliphatic radical which has from 1 to 30 carbon atoms and is unsubstituted or interrupted by from 1 to 5 heteroatoms or functional groups or substituted, wherein the nitrogen-comprising base is a compound whose nitrogen atom or atoms is/are primary, secondary or tertiary and which is derived from the quaternary compounds of formula (IVe), with the radical R forming the quaternary nitrogen of the quaternary compounds not being present and $R^1$-$R^4$, independently of one another, are as defined above.

2. The solution according to claim 1, comprising more than 1% by weight of cellulose, based on the total weight of the solution.

3. The solution according to claim 1, wherein the ionic liquid comprising anions and cations comprises at least one anion selected from the group consisting of the group of halides and halogen compounds of the formulae:

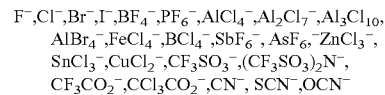

the group of sulfates, sulfites and sulfonates of the general formulae:

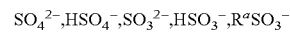

the group of phosphates of the general formulae

the group of phosphonates and phosphinates of the general formulae:

the group of phosphites of the general formulae:

the group of phosphonites and phosphinites of the general formulae:

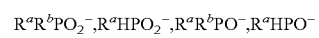

the group of carboxylic acids of the general formula:

the group of borates of the general formulae:

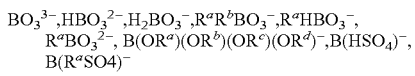

the group of boronates of the general formulae:

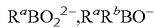

the group of carbonates and carbonic esters of the general formulae:

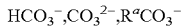

the group of silicates and silicic esters of the general formulae:

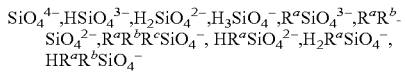

the group of alkyl silane and aryl silane salts of the general formulae:

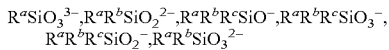

the group of carboximides, bis(sulfonyl)imides and sulfonylimides of the general formulae:

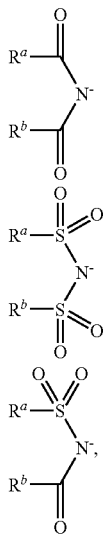

the group of methides of the general formula:

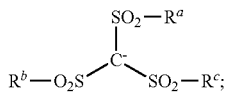

the group of alkoxides and aryloxides of the general formula

the group of halometalates of the general formula

where M is a metal and Hal is fluorine, chlorine, bromine or iodine, q and r are positive integers and indicate the stoichiometry of the complex and s is a positive integer and indicates the charge on the complex;

the group of sulfides, hydrogen sulfides, polysulfides, hydrogen polysulfides and thiolates of the general formulae:

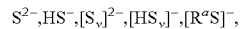

where v is a positive integer from 2 to 10; and the group of complex metal ions such as $Fe(CN)_6^{3-}$, $Fe(CN)_6^{4-}$, $MnO_4$ $Fe(CO)_4^-$, where $R^a$, $R^b$, $R^c$ and $R^d$ are each, independently of one another, hydrogen, $C_1$-$C_{18}$-alkyl, $C_2$-$C_{18}$-alkyl which is optionally interrupted by one or more nonadjacent oxygen and/or sulfur atoms and/or one or more substituted or unsubstituted imino groups, $C_6$-$C_{14}$-aryl, $C_5$-$C_{12}$-cycloalkyl or a five- or six-membered, oxygen-, nitrogen- and/or sulfur-comprising heterocycle, where two of them may together form an unsaturated, saturated or aromatic ring which is optionally interrupted by one or more oxygen and/or sulfur atoms and/or one or more unsubstituted or substituted imino groups, where the radicals mentioned may each be additionally substituted by functional groups, aryl, alkyl, aryloxy, alkyloxy, halogen, heteroatoms and/or heterocycles.

4. The solution according to claim 1 which has a temperature of not more than 180° C.

5. The solution according to claim 1, wherein the proportion of the nitrogen-comprising base is 6-20% by weight, based on the total weight of the solution.

6. A process for preparing a solution according to claim 1, comprising:
adding cellulose to a solution comprising said ionic liquid comprising anions and cations as solvent and said nitrogen-comprising base, and
mixing the solution until the cellulose is completely dissolved.

7. A method for the physical or chemical treatment of cellulose comprising dissolving cellulose in a solution comprising an ionic liquid as defined in claim 1.

* * * * *